(No Model.)

W. S. LINDSLEY.
CHURN DASHER.

No. 405,265. Patented June 18, 1889.

Witnesses
Frank S. Ober
R. W. Bishop

Inventor
William S. Lindsley
By his Attorneys

UNITED STATES PATENT OFFICE.

WILLIAM S. LINDSLEY, OF ADA, OHIO.

CHURN-DASHER.

SPECIFICATION forming part of Letters Patent No. 405,265, dated June 18, 1889.

Application filed December 31, 1888. Serial No. 295,051. (No model.)

*To all whom it may concern:*

Be it known that I, WILLIAM S. LINDSLEY, a citizen of the United States, residing at Ada, in the county of Hardin and State of Ohio, have invented new and useful Improvements in Churn-Dashers, of which the following is a specification.

My invention relates to improvements in churn-dashers; and it consists in certain novel features hereinafter described and claimed.

Figure 1:
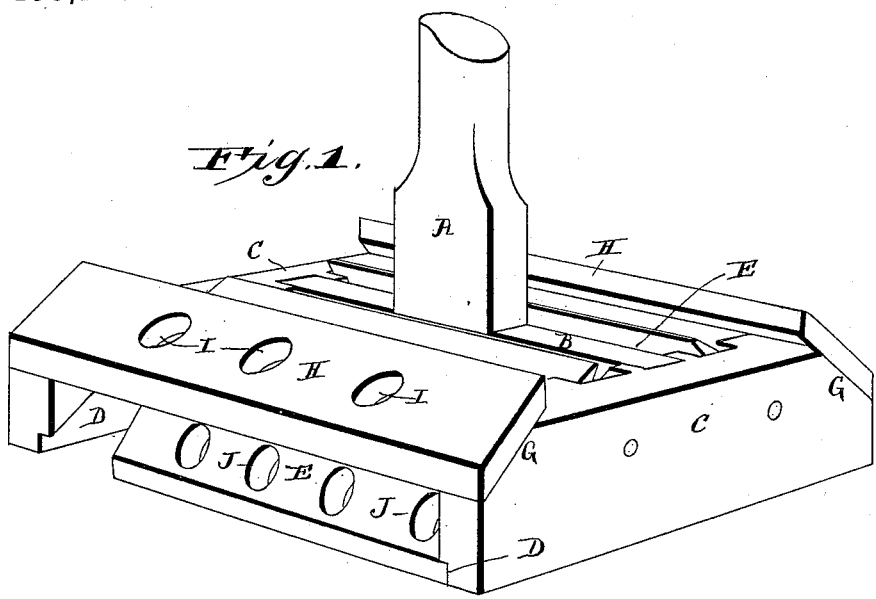
Figure 2:
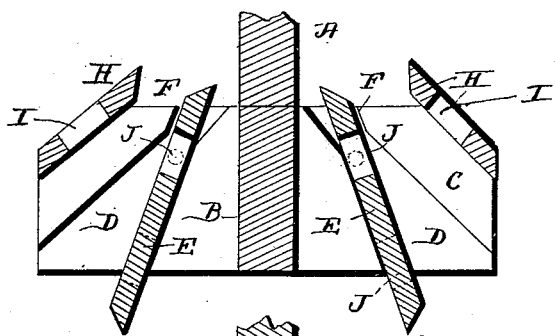
Figure 3:
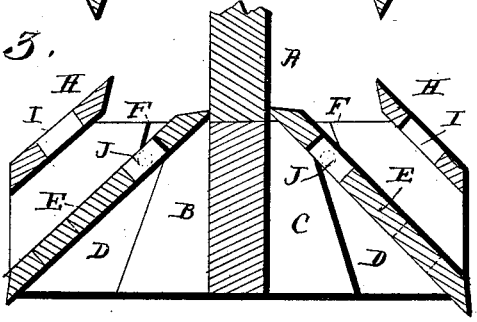

In the accompanying drawings, Figure 1 is a perspective view. Fig. 2 is a vertical transverse section showing the leaves in their lower position, and Fig. 3 is a similar view showing the leaves raised.

Referring to the drawings by letter, A designates the dasher-rod having a cross-bar B secured to its lower end, and C C are the similar side bars secured to the ends of the said cross-bar. The side bars are provided in their inner faces and on opposite sides of the cross-bar with the V-shaped recesses D, in the upper contracted ends of which I pivot the leaves E, the edges of which play in the said recesses between the walls of the same as the dasher is reciprocated. The sides of these leaves contact with the walls of the recesses, so as to limit the movement of the same, and the recesses are continued above their upper ends, so as to form the inclined shoulders F, against which the corners of the leaves contact. The upper corners of the side bars are cut away, as shown at G, and upon these cut-away corners I secure the breakers H, which extend between the side bars and are provided with perforations I for the passage of the cream. The leaves are provided with perforations J for the same purpose.

In pactice the dasher is reciprocated within the churn in the usual manner and by any desired mechanism and produces the butter very rapidly and easily. As the dasher is reciprocated, the leaves will vibrate between the walls of the recesses in the side bars, so as to thoroughly break up and agitate the cream. On the downstroke of the dasher the leaves will be thrown to the upper walls of the recesses and the cream thereby caused to pass through the perforations in the leaves and strike against the breakers, as will be readily understood, so as to throw the cream against the sides of the churn and thereby produce a thorough agitation of the same. On the upstroke of the dasher the leaves will fall against the lower walls of the recesses, so that the forming butter will be allowed to fall to the bottom of the churn and be collected at that point. After the butter has been formed it can be readily gathered into one mass by my improved dasher, as by giving the particles of butter a few light strokes they will be forced to the desired point and collected.

My improved churn-dasher is very cheap and simple and its efficiency is thought to be obvious.

Having thus described my invention, what I claim, and desire to secure by Letters Patent, is—

The improved churn-dasher herein described and shown, comprising the cross-bar B, secured to the lower end of the dasher-rod, the side bars C C, secured to the ends of the said cross-bar and having their upper corners cut away and provided in their inner faces with the V-shaped recesses D, which are continued above their upper contracted ends to form the inclined shoulders F, the perforated breakers secured to and between the cut-away corners of the side bars, and the perforated leaves pivoted in the upper ends of the recesses D and having their edges playing between the walls of said recesses and their corners adapted to come into contact with the shoulders F, as specified.

In testimony that I claim the foregoing as my own I have hereto affixed my signature in presence of two witnesses.

WILLIAM S. LINDSLEY.

Witnesses:
W. W. LEPPIN,
SAMUEL BLACK.